2 Sheets--Sheet 1.

H. WILDE.

Machines for Crozing and Chamfering Staves.

No. 5,626. Reissued Oct. 21, 1873.

Edward Wilhelm
John J. Bonner } Witnesses

Edward Holmes
Britain Holmes
Assignees of Henry Wilde
by Jay Hyatt Atty.

AM. PHOTO-LITHOGRAPHIC Co N.Y. (OSBORNE'S PROCESS)

2 Sheets--Sheet 2.

H. WILDE.

Machines for Crozing and Chamfering Staves.

No. 5,626. Reissued Oct. 21, 1873.

Edward Wilhelm
John J. Brennan
Witnesses

Edward Holmes
Britain Holmes
Assignees of
Henry Wilde
by Jay Hyatt
Atty.

AM. PHOTO-LITHOGRAPHIC Co. N.Y. (OSBORNE'S PROCESS)

UNITED STATES PATENT OFFICE

HENRY WILDE, OF NEWARK, NEW JERSEY, ASSIGNOR TO EDWARD HOLMES AND BRITAIN HOLMES, OF BUFFALO, NEW YORK.

IMPROVEMENT IN MACHINES FOR CROZING AND CHAMFERING STAVES

Specification forming part of Letters Patent No. 36,186, dated August 12, 1862; reissue No. 5,626, dated October 21, 1873; application filed May 29, 1873.

*To all whom it may concern:*

Be it known that HENRY WILDE, of the city of Newark, county of Essex and State of New Jersey, did invent certain Improvements in Machines for Crozing and Chamfering Staves, of which the following is a specification:

The invention relates to that class of machines in which the cylinder of staves to be dressed is secured between two chucks, and slowly revolved, so as to bring the successive portions of each end of the stave-cylinder in engagement with rapidly-revolving dressing tools or cutters.

Figure 1:
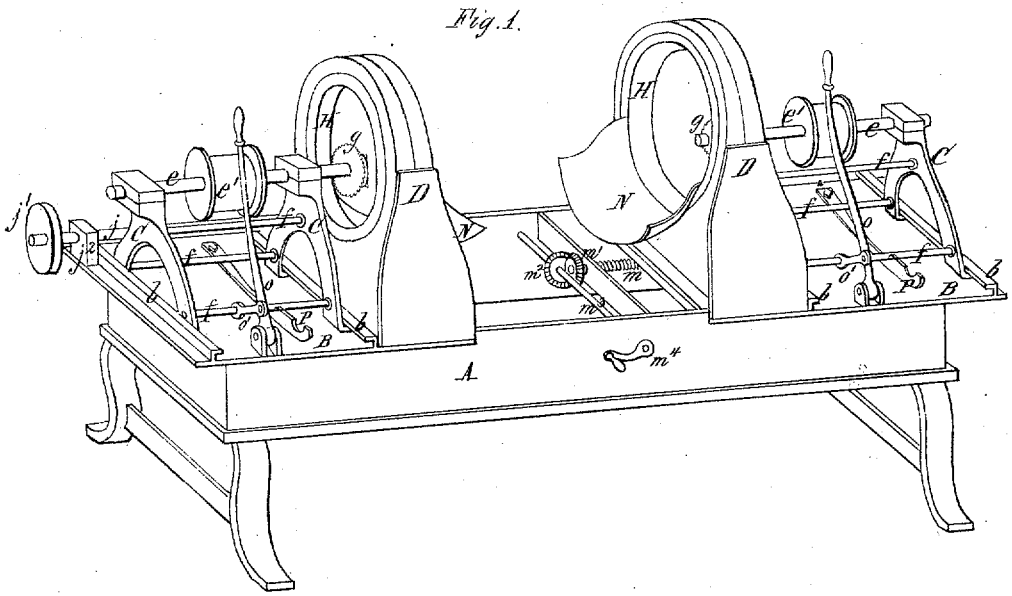
Figure 2:
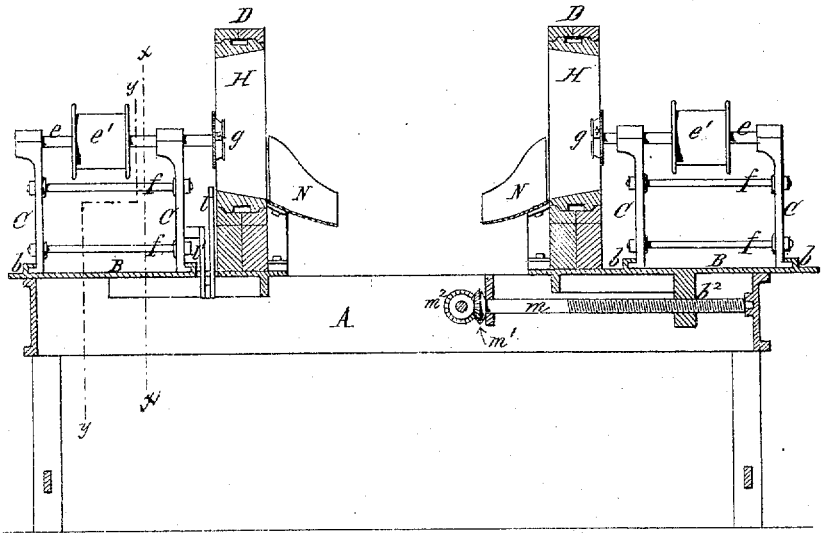
Figure 3:
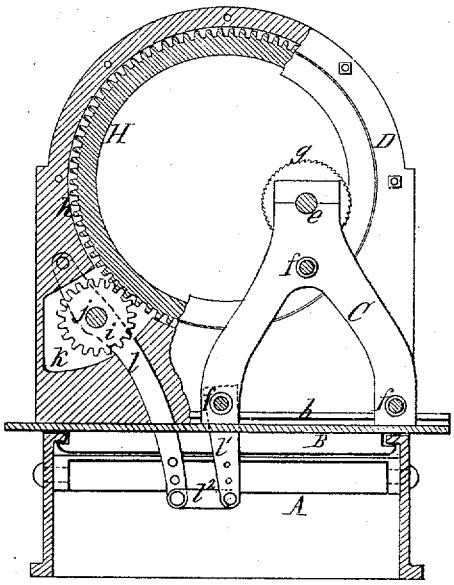
Figure 4:
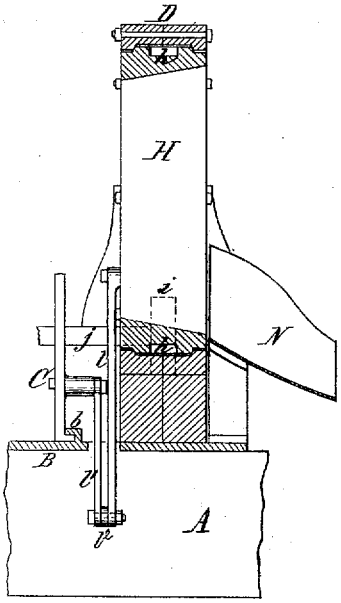
Figure 5:
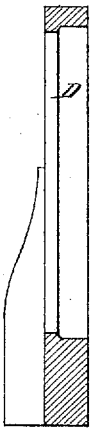
Figure 6:
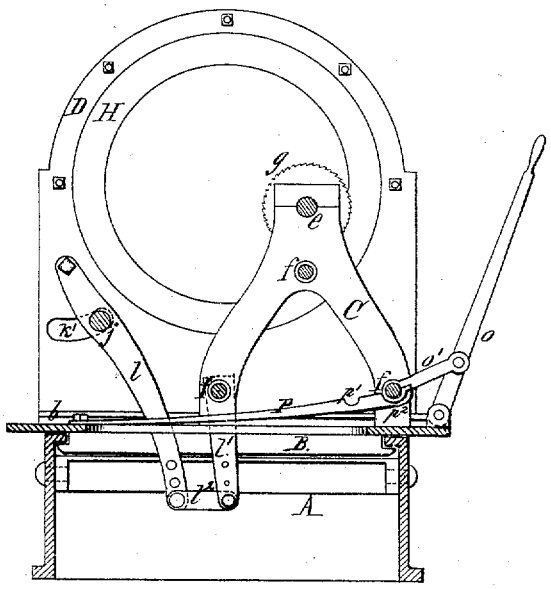
Figure 7:
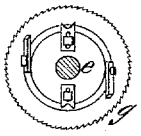
Figure 8:
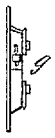

In the accompanying drawings, Figure 1 is a perspective view of the improved machine; Fig. 2, a longitudinal vertical section thereof; Fig. 3, a transverse vertical section in line *x x*, Fig. 2, on an enlarged scale. Fig. 4 is a longitudinal vertical section of one of the heads or mandrels, and the bearing thereof; Fig. 5, a vertical section of one-half of the circular bearing of one of the chucks or revolving rings which receive the end of the barrel. Fig. 6 is a transverse vertical section in line *y y*, Fig. 2. Fig. 7 is a face view of the cutters or dressing-tools. Fig. 8 is an edge view of the same.

Like letters of reference designate like parts in each of the figures.

A is the main frame of the machine; B B, bed-plates, movable lengthwise of the frame. C C are bearings for the mandrels or cutter-shafts *e e*. These bearings are connected by tie rods or bars *f f*, and slide between transverse ways *b b* secured to the bed-plates B. *g g* are two sets of cutters, mounted, respectively, on the mandrels *e e;* and *e'* are driving-pulleys on said mandrels. D D are bearings for the revolving rings or chucks H H attached rigidly to the bed-plates B. As shown in the drawings, these bearings are made in halves, and bolted together, forming a recess, in which the revolving rings H are securely held against lateral displacement, while they are permitted to freely revolve. One of these rings, on its inner surface, is provided with points or dogs, which engage with the stave-cylinder when the latter is adjusted therein, and insures its rotation with the ring. The peripheries of the rings are provided with teeth *h h*, with which a pinion, *i*, is made to engage when the ring and stave-cylinder are required to be rotated. *j* is the shaft upon which the pinion *i* is mounted. The outer end of this shaft, provided with a driving-pulley, $j^1$, revolves in a bearing, $j^2$, attached to the bed-plate, while the inner end is mounted in an arm or lever, *l*, pivoted at its upper end to the bearing D, so that the pinion *i* can be made to approach, or recede from, the revolving ring H. The bearing D is provided with a recess, *k*, and slot *k'*, to allow of this movement of the pinion *i* and shaft *j*, respectively. $l^1$ is an arm, secured to the inner bearing C of the mandrel. The lower ends of the arms *l* $l^1$ are provided with a series of holes, and connected by a link, $l^2$. *m* is a screw-shaft, working through a threaded lug, $b^2$, depending from the under side of the bed-plate B. $m^1$ is a bevel-pinion at the end of the screw-shaft, engaging with a similar pinion, $m^2$, on a shaft, $m^3$, extending transversely of the frame, and rotated by a crank, $m^4$, on the outer end thereof, by which the bed-plates and parts attached thereto are adjusted longitudinally. N N are curved inclines or guides, supported by standards or braces secured to the bearings D. *o* are levers, jointed at their lower ends to the bed-plates B, and connected, by a link or arm, *o'*, to one of the tie-rods *f*, which connect the bearings C. P is a spring-catch, secured at one end to the bed-plate, and extending across the machine, with its free end provided with notches $p^1$ $p^2$, which alternately engage with the tie-rod *f*, as the bearings C are adjusted, and hold them in place, as will presently be explained.

Instead of the spring-catch P, a cord and weight may be used to hold the parts in place after they have been adjusted by the levers *o*.

The barrel or cask being set up, and forming a stave-cylinder, is placed with its ends resting upon the curved inclines N, when, by turning the crank $m^4$, the rings or chucks H are made to approach each other, the inclines operating to guide the ends of the stave-cylinder into the rings or chucks H. The levers *o* are now moved outward, which slides the bearings C in the ways $b$, so as to bring the cutters in contact with the inner surface of the ends of the stave-cylinder, in which position it is held by the outer notch, $p^2$, of the spring-catch engaging with the rod $f$, as shown in Fig. 6. This movement of the lever $o$, through the medium of the connected arms $l\ l^1$, swings the pinion $i$ into engagement with the ring H, by which slow rotary motion is imparted to said rings and stave-cylinder simultaneously with the engagement of the cutters with the latter, by which the ends of the staves are howeled, crozed, and chamfered as the cylinder slowly revolves. To insure an equal depth of croze in irregular staves, a roller is put on the end of the mandrel that holds the cutters. After the stave-cylinder has completed a revolution, the levers $o$ are pressed inward, which withdraws the cutters from contact with the staves, and disengages the pinion $i$ from the ring H, the inner notch, $p^1$, of the spring-catch now engaging with the rod $f$, and holding the parts in place. The chucks are then withdrawn from each other by reversing the crank $m^4$, when the dressed cylinder of staves is removed and another cylinder substituted.

What is claimed as the invention of the said HENRY WILDE is—

1. In a barrel crozing and chamfering machine, the combination, with the revolving ring or chuck H, which receives and holds the stave-cylinder, of a driving-wheel engaging with the periphery of the revolving ring, and imparting motion thereto for rotating the stave-cylinder, all constructed and arranged substantially as hereinbefore set forth.

2. The combination, with the revolving ring or chuck and driving-wheel, of the bearing D, surrounding and protecting the same from chips and dirt, substantially as hereinbefore set forth.

3. The combination, with the revolving rings H, of the relatively stationary guides N, for facilitating the chucking of the stave-cylinder, substantially as hereinbefore set forth.

4. The combination, in a barrel crozing and chamfering machine, with the longitudinally-adjustable bed-plate and bearing for the revolving ring or chuck secured thereto, of the bearings C C of the shaft of the cutter-head, made transversely adjustable on said bed-plate, substantially as hereinbefore set forth.

5. The combination, with the revolving ring or chuck which holds the stave-cylinder, of the driving-wheel and adjustable bearing for the shaft of the latter, by which said driving-wheel is thrown in and out of gear simultaneously with movement of the cutter-bearings, substantially as hereinbefore set forth.

6. The combination, with bed-plate B, revolving ring H, and bearings C D, of the driving wheel and shaft $i\ j$, arms $l\ l^1$, and connecting-link $l^2$, by which the wheel $i$ is adjusted simultaneously with the cutter-head, substantially as hereinbefore set forth.

7. The combination, with the bed-plate B and bearings C C, of the cutter-shaft, the lever $o$, link $o'$, and spring-catch P, substantially as hereinbefore set forth.

BRITAIN HOLMES.
EDWARD HOLMES.

Witnesses:
R. CARMICHAEL,
JNO. J. BONNER.